(12) United States Patent
Omar

(10) Patent No.: US 9,106,666 B2
(45) Date of Patent: Aug. 11, 2015

(54) METHOD AND SYSTEM FOR FACILITATING CONTROLLED ACCESS TO NETWORK SERVICES

(71) Applicant: Hassan M. Omar, Mt Vernon, NY (US)

(72) Inventor: Hassan M. Omar, Mt Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 200 days.

(21) Appl. No.: 13/665,646

(22) Filed: Oct. 31, 2012

(65) Prior Publication Data

US 2014/0123222 A1    May 1, 2014

(51) Int. Cl.
| H04L 29/06 | (2006.01) |
| G06F 7/04 | (2006.01) |
| G06F 15/16 | (2006.01) |
| G06F 17/30 | (2006.01) |

(52) U.S. Cl.
CPC .................................... H04L 63/102 (2013.01)

(58) Field of Classification Search
None
See application file for complete search history.

(56) References Cited

U.S. PATENT DOCUMENTS

| 2006/0059551 | A1* | 3/2006 | Borella ............................ 726/13 |
| 2007/0004393 | A1* | 1/2007 | Forsberg et al. ............... 455/420 |
| 2007/0143824 | A1* | 6/2007 | Shahbazi ........................... 726/1 |
| 2008/0160958 | A1* | 7/2008 | Abichandani et al. ........ 455/410 |
| 2008/0214167 | A1* | 9/2008 | Natsuno et al. ............. 455/414.3 |
| 2012/0159578 | A1* | 6/2012 | Chawla et al. ..................... 726/4 |
| 2012/0208460 | A1* | 8/2012 | Shin ............................. 455/41.1 |
| 2013/0067208 | A1* | 3/2013 | Brinkman et al. ................. 713/1 |
| 2013/0078949 | A1* | 3/2013 | Pecen et al. .................... 455/411 |
| 2013/0205366 | A1* | 8/2013 | Luna et al. ......................... 726/1 |
| 2013/0263287 | A1* | 10/2013 | Ayyalasomayajula et al. . 726/30 |
| 2014/0095692 | A1* | 4/2014 | Anderson et al. ............. 709/224 |

* cited by examiner

*Primary Examiner* — Shin-Hon Chen

(57) ABSTRACT

An approach for enabling controlled access to a limited set of remote services associated with a device is described. A controlled access platform determines one or more network access descriptors to associate with a calling application of a device configured to access a remote service via a communication network. The controlled access platform initiates a limiting of the calling application to one or more allowed network interaction types with a remote service or a network access component associated with the device based on a profile for defining one or more allowed network interaction types between the calling application and the remote service.

18 Claims, 11 Drawing Sheets

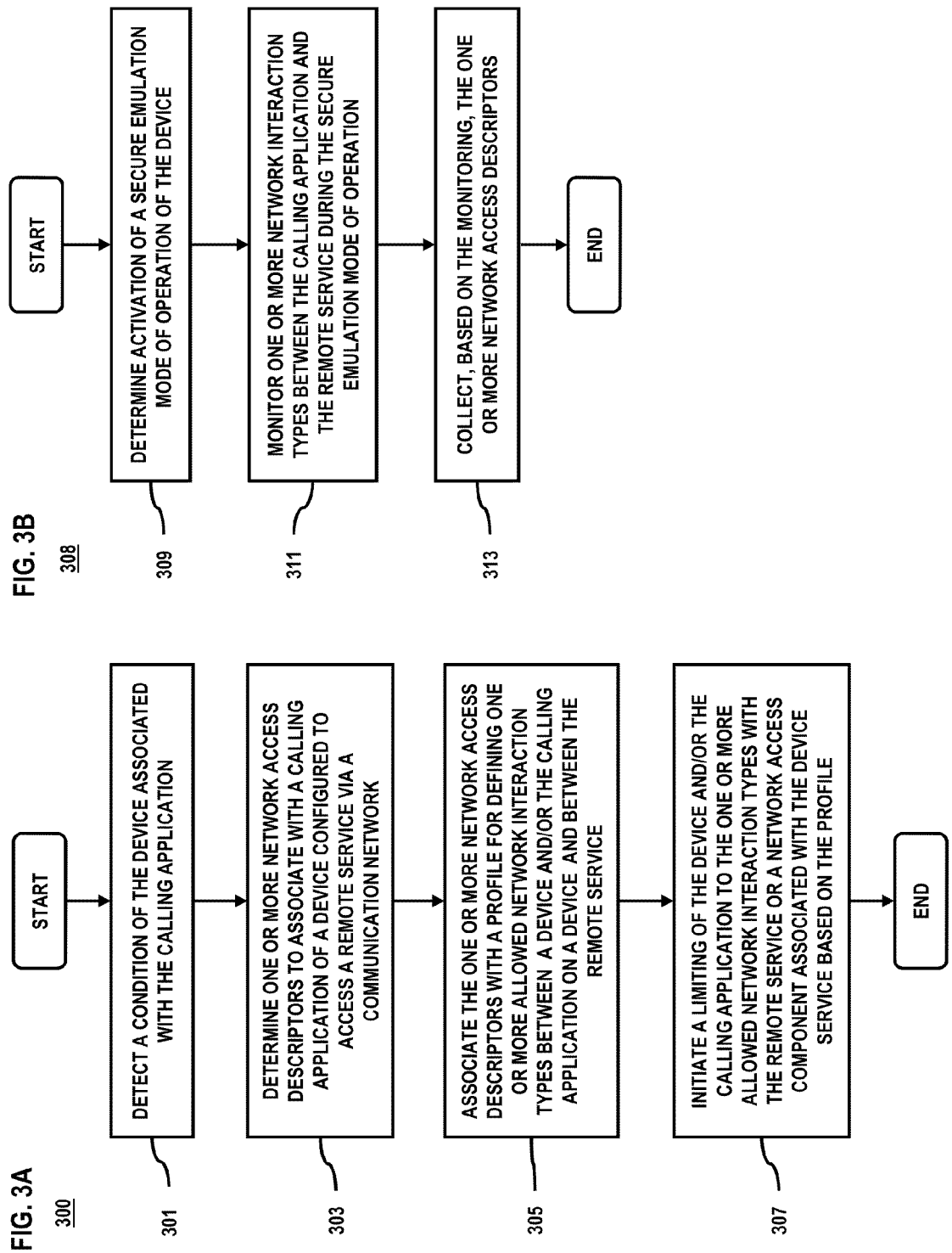

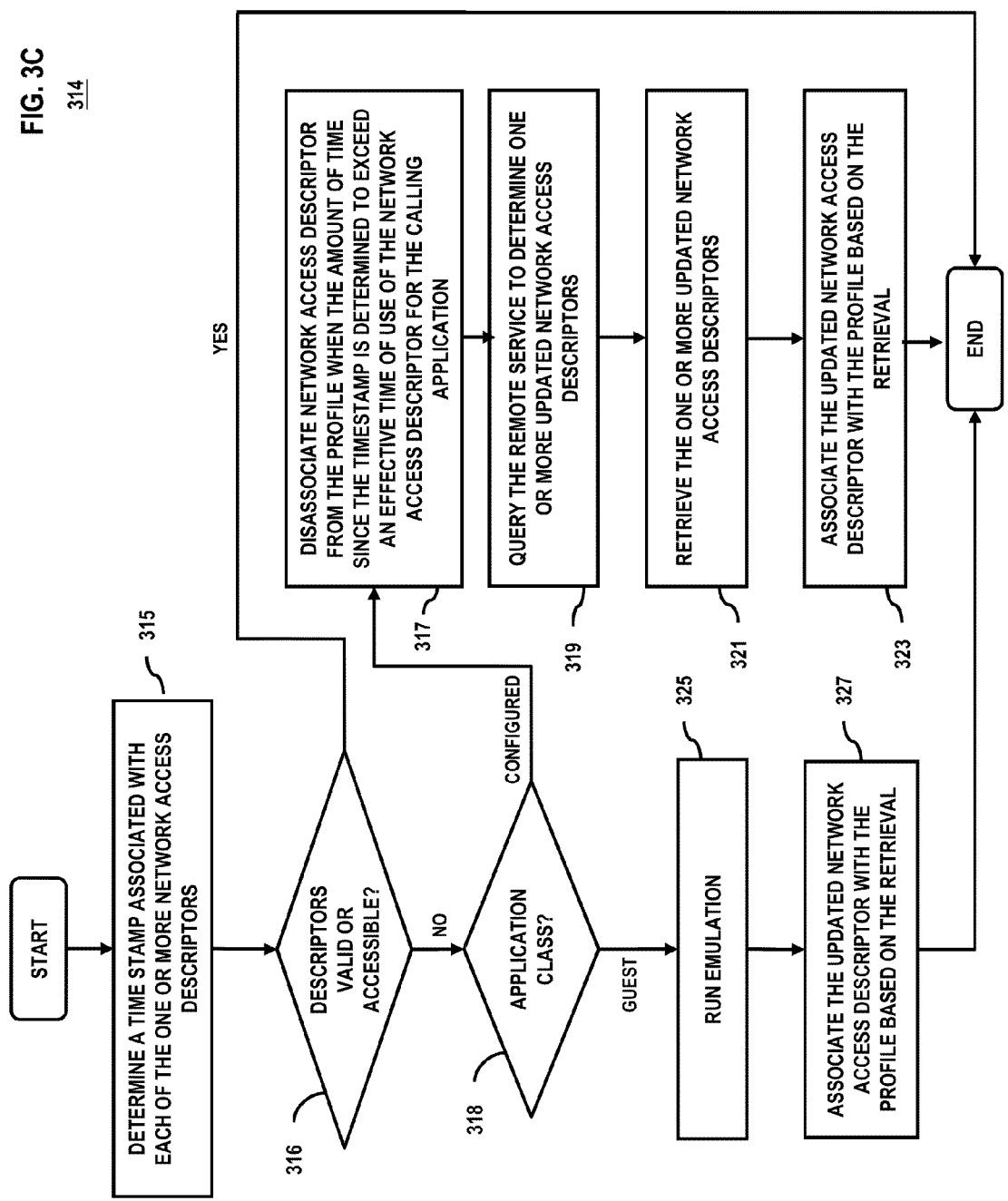

400

400

METHOD AND SYSTEM FOR FACILITATING CONTROLLED ACCESS TO NETWORK SERVICES

BACKGROUND INFORMATION

Service providers are continually challenged to deliver value and convenience to consumers by providing compelling network services and advancing the underlying technologies. One area of interest has been the development of services and technologies for enabling secure use of various applications and services made available to devices (e.g., desktops, mobile devices, etc.). Many computing devices are susceptible to viruses, breaches and other forms of malicious attack that can impact the performance and safe usage. In certain situations, however, the user may require use of the device even when they suspect or have indication that the device may have been breached, i.e., continued access to various features of a financial application or service for carrying out a critical financial transaction. Unfortunately, there is currently no convenient means of enabling the user of the device to have targeted, controlled access to various services and applications of the device while also maintaining a high level of security.

Based on the foregoing, there is a need for controlled access to a limited set of remote applications associated with a device.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for enabling controlled access to a limited set of remote services associated with a device, according to various embodiments;

DESCRIPTION OF THE PREFERRED EMBODIMENT

An apparatus, method and software for enabling controlled access to a limited set of remote services associated with a device are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
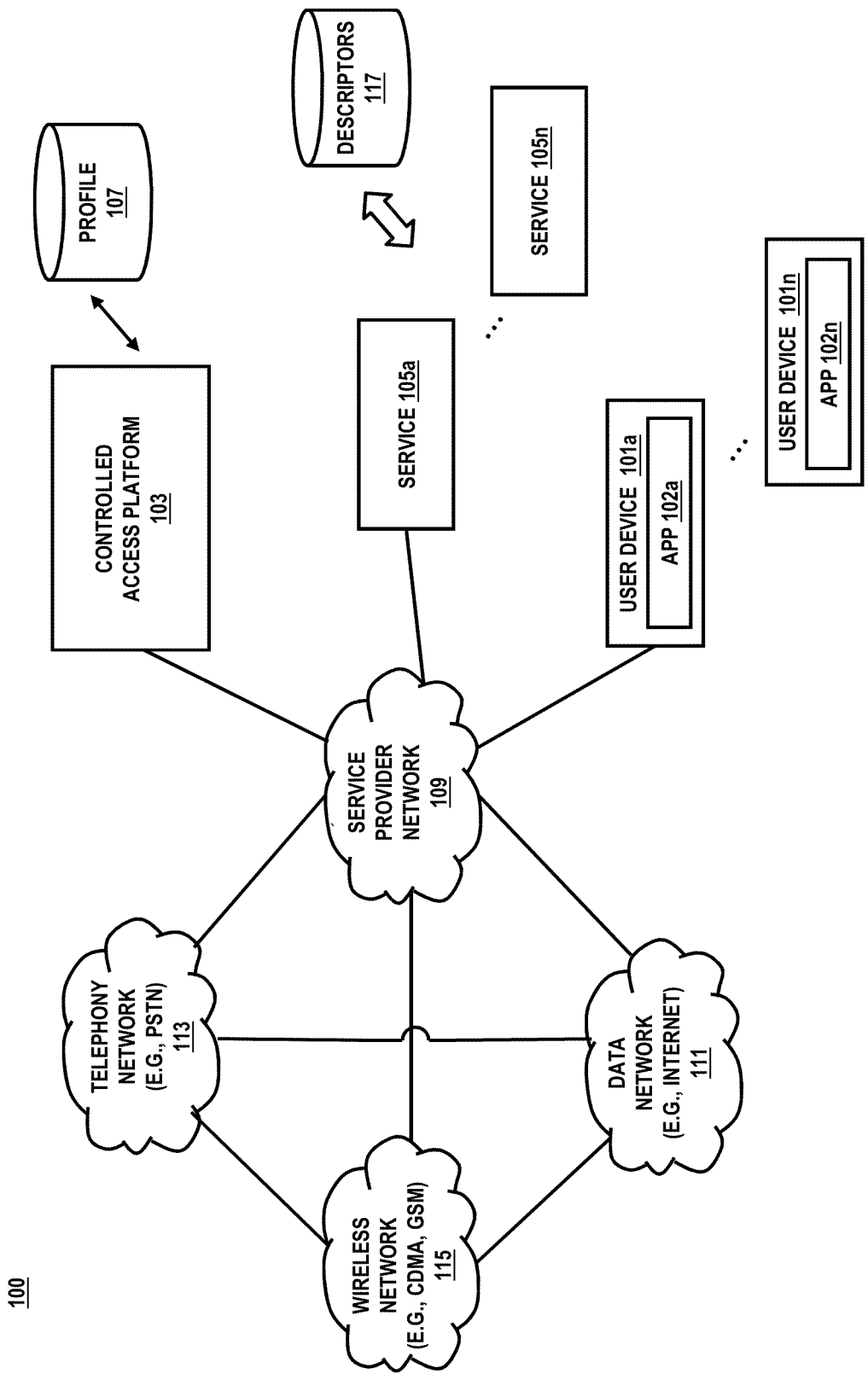
FIG. 1 is a diagram of a system for enabling controlled access to a limited set of remote services associated with a device, according to one embodiment.

FIG. 1 is a diagram of a system for enabling controlled access to a limited set of remote services associated with a device, according to one embodiment. By way of example, a remote service may include any widget, utility or application capable of being accessed by a calling application of a device via a communication network (e.g., service provider network 109). The calling application may be installed on the device and may feature one or more application programming interfaces (APIs) or call executions for activating the remote service. As such, the calling application may formulate a session with the remote service for exchanging data required for fulfilling the call execution or carrying out an application request.

As mentioned, many applications and user devices—especially those capable of interfacing with a communication network—are susceptible to security breaches. With the spread of computer viruses, worms, back door algorithms and other types of malicious security schemes, there are instances where a user may require use of their device despite the security condition. For example, the user may need to use an application on their mobile device while they are on the go in order to complete a critical task, i.e., due to lack of access to their work computer. Under this scenario, the user may wish to access certain features of the application for a limited time, therefore requiring only a limited number or type of remote service calls.

One approach to accomplishing this is traffic filtering, wherein one or more static rules are applied to the device for defining the allowable network interactions. This approach is not effective for most device users considering the high level of technical expertise required to configure such a scheme. Also, this approach is further complicated given the complexity of the forwarding mechanisms associated with some network services; many of which employ content delivery networks (CDN) or other network components and schemes that may not be compatible with a fixed set of rules.

Another approach is to attempt to audit or correct the security breach by installing and/or running resolution software (such as a security threat removal tool). However, given that some of the attacks (e.g., virus, key-logger algorithm or other malicious code) can interfere with or prevent the resolution software from detecting and resolving the issues, there is a possibility technical professional intervention is required. Accordingly, the time duration between the detection of the security concern and resolution of the concern can be considerably long.

As yet another approach, a dynamic filtering scheme may be employed for enabling controlled access to network services based on the identity of flows initiated from the device (presumed trusted). However, this is still not a feasible solution considering that some of the device configurations may have been maliciously manipulated to facilitate unwarranted behavior and/or communications. Unfortunately, there is currently no convenient means of enabling the user of the device to employ targeted, controlled access to various services and applications of the device while also maintaining a high level of security.

To address these issues, system 100 of FIG. 1 introduces a controlled access platform 103, which is configured to facilitate network connectivity to a limited set of remote applications or services 105a-105n associated with user devices 101a-101n. By way of this system 100, a user is able to resume access to one or more network services 105a-105n in a controlled manner such that a known security risk of the user device 101a-101n is minimized; thus enabling user device 101a-101n to continue working with only the preferred applications 102a-102n and/or corresponding network services 105a-105n identified by the user. For the purpose of illustration, the remote applications or services 105a-105n are referred to herein collectively as services 105 while the user devices 101a-101n are referred to herein collectively as user devices 101. As noted, the services 105 may be called upon by a calling application 102a-102n, referred to herein collectively as applications 102, which are installed onto or accessible (e.g., as a cloud or hosted solution) by the devices 101.

In certain embodiments, the controlled access platform 103 maintains profile information 107 for affecting the mode of operations of a user device 101 and corresponding application 102 thereof with a network service 105. By way of example, the profile information 107 specifies details regarding the user devices 101, the users of said devices and various network descriptors 117 for defining one or more allowable network interactions. Allowable network interactions may include any application or service tasks deemed by the user as necessary to be performed for execution of an application need and/or despite the presence/detection of an adverse security condition. For the purpose of illustration, the profile information 107 may be activated and/or called for execution by the controlled access platform 103 in response to the detection of a security condition (e.g., a data breach or virus detection). Alternatively, the profile information 107 may be activated and/or called manually by a user of the device 101, such as to accommodate a certain mode or type of use of the application 102 (e.g., to perform a data sensitive task) or in response to the detection of a security condition by the user. Calling/execution of a profile 107, per the profile information 107, enables restricted activation of select features of an application 102 in connection with a corresponding remote service 105.

The profile information 107 (or profile) may include identifier data pertaining to the devices 101, such as a user identifier, subscriber identifier or device identifier. In the context of a subscription model, wherein the users of devices 101 register/subscribe with the controlled access platform 103, the profile information 107 may be established during initial registration. By way of example, the registration/subscription may be performed as an independent procedure or as an extension to an already existing service. In the latter case for example, a high speed internet access service provider may offer access to the controlled access platform 103 as a value added feature to its existing customers. It is noted that the procedure may be carried out by way of telephone, online data entry or any other means.

Per the registration procedure, the profile 107 may specify one or more user preferences, such as a preferred means of contacting the subscribed device 101 for confirming activation of a profile 107, i.e., in response to a security or usage need. The preferred means of contact may include short messaging service (SMS), email or the like. Still further, the profile 107 may specify the allowed access types for configuring or updating a profile such as by phone or via online access. It is noted that a user may create multiple different profiles for accommodating different application and/or service usage contexts or for handling different security conditions relative to a given user device 101. However, only a single profile can be active for use in connection with the user device 101 at any given time.

The profile 107 may also reference or include data for specifying one or more rules of engagement between the user devices 101 and/or calling application 102 thereof with a corresponding network service 102. Rules are enforced by the controlled access platform 103 based on the referencing of one or more network access descriptors or descriptors 117 associated with the different applications 102. In certain embodiments, the network access descriptors 117 may include a set of values, such as the IP address or set of IP addresses and transmission control protocol (TCP) or user datagram protocol (UDP) port numbers associated with an application. This may include data contained in fields in the IP and transport layer headers of data transmitted by the application 102 for calling out to or accessing the various remote services 105. In addition, the network access descriptors 117 may further include fields such as a quality of service (QoS) indication or priority marking. It is noted that the network access descriptors 117 for an application 102 or corresponding service 105 may be dynamic and therefore dependent upon the user IP address, adaptations in network configurations and other factors.

The profile 107 may also specify one or more IP entities or circuits thereof that are associated with the user device 101 registered with the controlled access platform 103. Per this scenario, the profile may specify the IP addresses and corresponding network channels (port numbers) assigned to the configured IP entities. The IP entity corresponds to a network access component or node that is associated with an IP address the user device 101 employs for accessing the service 105 via the network 109. The type of IP entity associated with the device 101 depends on the network connectivity service of the network provider. For example, the user device may be configured to the service provider network 109 via an asynchronous transfer mode permanent virtual circuit (ATM PVC) or an Ethernet virtual local area network (VLAN) that terminates on a network element such as a Broadband Remote Access Server (BRAS). It is noted that the designated IP entity may therefore correspond to an IP termination point of the network 109.

As such, the rules associated with a given profile 107 permits controlled accessing of the IP entities at their respective termination points. Under this scenario, the IP entities serve as enforcement elements of the profile 107, wherein said enforcement elements are selectively restricted and/or allowed to provide network access as a means of restricting and/or allowing application 102 calling of one or more services 105. It is noted that the IP entity may be any type of network access component, including a packet data network gateway that serves as a network access component for a smartphone, a broadband router configured for a home based wireless network, or the like.

For the purpose of illustration, an exemplary profile 107 record is shown below in Table 1. This profile corresponds to an instance where a user registers, for example, a digital signal line (DSL) system and wireless device with the controlled access platform 103.

TABLE 1

Subscriber name: John Smith
DCAS account ID: DCAS_ACCT/WXYZ67890
Number of data service circuits covered: 2
Circuit # 1
Data service type: Wired-DSL
Data service provider: Provider_A
Subscriber account ID with data service provider:
W_DATA_ACCT/NY/WPL/ABCD12345
Subscriber IP termination point information:
    BRAS ID = NY_WPL_918555
    Slot/Port ID = 8/2
    ATM Virtual Path (VP) = 33
    ATM Virtual Channel (VC) = 918
. . .
Circuit #2
Data service type: Wireless-DATA
Data service provider: Provider_B
Subscriber account ID with data service provider:
Wl_DATA/NY/WPL/EFGH/9876543
Current DynamicSubscriber IP termination point information:

TABLE 1-continued

Termination Point 1
    PDN-GW ID = NY_WPL_998877
    PDN-GW subscriber-termination ID = 2345678
Termination Point 2
    PDN-GW ID = NJ_NWK_665544
    PDN-GW subscriber-termination ID = 8765432

It is noted that, per this example, the termination point for the DSL system corresponds to that of a BRAS while that of the wireless device corresponds to a PDN-GW.

In order to register the IP entities for association with a profile 107, the user may provide their data service account identifier to the controlled access platform 103 during the registration procedure. The controlled access platform 103 then retrieves the corresponding circuit information (topology information) from the provider accordingly, such as by way of a query procedure. In addition, the controlled access platform 103 may interface with an operations support system (OSS) of the service provider network 109—which maintains the IP entity and circuit topology information—for retrieving the information via a query procedure. The query may be submitted as a request for the following information, as shown in Table 2 below:

TABLE 2

Type of Query
The Data Subscriber Account ID for which the controlled access platform 103 is requesting the corresponding topology information
The IP address or hostname for the query source (e.g., the controlled access platform 103)
The IP address or hostname for the query target (e.g., OSS system)

The topology response, as received from the OSS system, may include the following information, per Table 3:

TABLE 3

Type of Query Response
The IP address or hostname for the response source (OSS system)
The IP address or hostname for the response target (controlled access platform 103)
The Data Subscriber Account ID for which the OSS system is responding with the corresponding topology information
Status of the account (e.g., Active or On-hold)
Enforcement element/IP entity type (e.g., packet data network gateway, broadband router)
Enforcement element/IP entity identification
Descriptors associated with the subscriber termination point on the enforcement element/IP entity (such as slot/port ID, ATM virtual path and virtual channel ID, VLAN number)
IP address or IP pool associated with the user-the field includes a network mask to identify the appropriate IP range.

It is noted that the request and response for the topological information—as related to the IP entities (network access components)—may be generated according to various formats. For example, the request may be submitted as an extended markup language (XML) message or other format.

As noted, when a user activates a profile 107, the controlled access platform 103 limits the communications associated with the user IP entity to a pre-identified set of remote applications. Hence, enforcement of this limitation requires that the IP entity be provided the network descriptors 117 associated with the calling application 102 (e.g., IP address (or addresses) and port numbers (or port number ranges) associated with each application 102 on a particular device 101). In certain embodiments, the descriptors 117 corresponding to the applications 102, services 105 and corresponding IP enti-ties (e.g., enforcement elements) are associated with the profile 107 based on an acquisition procedure. By way of example, the acquisition procedure enables the controlled access platform 103 to account for differences in delivery approaches between the services 105 capable of being accessed by a calling application 102. This includes, for example, delivery approaches wherein traffic as generated by the service 105 is forwarded through the use of content delivery network (CDN) cache appliances, domain name server (DNS) manipulation, geographic based schemes, etc. It is noted that the acquisition procedure is conducted during user registration with the controlled access platform 103, during an updating process or subsequently at the discretion of the user.

The means of acquisition of the descriptors 117 is based on the type of application 102 and/or service 105 to be called. A first class of application, referred to herein as a configured application, features a software interface for retrieving the descriptors 117 from the corresponding service(s) 105. Per this class, the services 105 are able to be queried by the controlled access platform 103 for initiating the retrieval. A second class of application, referred to herein as a guest application, does not feature any such interface for retrieval of the descriptors 117. Per this class, the services 105 do not feature an interface for enabling automated retrieval of the network access descriptors 117 and are able to be retrieved based on an emulation procedure.

In certain embodiments, the configured applications 102 may include those prearranged to interact with the controlled access platform 103 via an interface element. The applications 102 may include, for example, a social networking, email or banking application as provided by an application provider (which may in some instances also be the provider of services 105). The application 102 may be acquired by the user via a download or push procedure, wherein it is already configured as controlled access platform compliant. According to this arrangement, the application provider supplies the controlled access platform 103 provider with the needed information regarding the application 102 IP addresses used to provide service to the requesting user IP address and/or possible ranges thereof. It is noted that the service 105 provider is best positioned to provide such information. For example if the traffic delivery associated with the service 105 as called by the application 102 involves CDN forwarding, the application provider (either operating its own CDN or utilizing a CDN provider) has the details regarding the cache selection rules as well as the IP addresses allotted to respond to a particular user IP address.

For a wired internet access service, the user device 101 having operable thereon the calling application 102 is typically allocated a dynamic IP address from a pre-configured pool of IP addresses maintained by the network provider. Accordingly, it is possible to predict the range of source IP addresses that can be used by a particular user/subscriber. As such, the controlled access platform 103 must have sufficient information to identify all the IP addresses a subscribed user with a particular IP address—to which the user's device 101 and/or IP entity is connected—may communicate with in the context of a particular remote service 105. As such, the interface enables the controlled access platform 103 to submit a query request to the service 105. In particular, the query is submitted to the interface corresponding to each of the configured applications 105 loaded onto or accessible by the user device 101. Table 4 below presents exemplary request types as submitted per the query by the controlled access platform 103.

TABLE 4

A query type
Client IP to indicate the subscriber/user IP or IP pool for which the controlled access platform 103 is seeking the corresponding Network access descriptors. The field includes a network mask to identify the appropriate IP range
The IP address or hostname for the query source (e.g., controlled access platform 103)
The IP address or hostname for the query target (e.g., interface to the controlled access platform 103 as implemented at the configured application service)
An Application ID, which is an identifier that uniquely identifies the application (e.g., 16 bit numerical value)

Resultantly, the services associated with the configured applications 102 that receive the query respond back to the controlled access platform 103 with the following information, as shown in Table 5 below:

TABLE 5

A query response type
Client IP to indicate the subscriber/user IP or IP pool for which the application 102 is providing corresponding network access descriptors. The field includes a network mask to identify the appropriate IP range
The IP address or hostname for the response source (e.g., interface to the controlled access platform 103 as implemented at the configured application service)
The IP address or hostname for the response target (e.g., controlled access platform 103)
An Application ID, which is an identifier that uniquely identifies the application (e.g., 16 bit numerical value)

While the query procedure as described above is directed to the applications 102, it is noted in certain embodiments that the query may alternatively be directed to the services 105. For example, the services 105 may also communicate with the controlled access platform 103 via the interface. It is also noted that the aforementioned request and response procedures may be generated according to various formats, e.g., as an extended markup language (XML) input/output message.

In certain embodiments, the guest applications 102 may include those that are not prearranged to interact with the controlled access platform 103 via an interface element. This may include, for example, applications 102 offered by application or service providers not willing to provide the descriptors 117 or that are not yet registered and/or implemented for interaction with the controlled access platform 103. As such, an emulation procedure is required for accessing (or deriving) the network access descriptors 117 rather than automated retrieval. The emulation procedure enables the controlled access platform 103 to identify the descriptors 117 without support from the application provider. Of note, the emulation procedure may be performed for a period of time or evaluation of an application or for a predetermined number of application calls/service calls.

By way of example, the controlled access platform 103 allows device 101 users to access the guest applications and interact with them through an emulator—i.e., a tool that emulates the application usage and/or operating system environment of the user device 101. The emulator may be graphical or command line based and the controlled access platform 103 may provide the user with a number of different utilities to choose from. This may include, for example, a hypertext transfer protocol (HTTP) client, a secure shell (SSH) client a Telnet client or a customized application client. A customized application client is a utility that has the needed support, with appropriate protocols and functionality, to communicate with a remote service. The remote service may provide this customized application client to the provider of the controlled access platform for integration purposes. As the user interacts with the guest application on service 105 through this environment, the controlled access platform 103 analyzes the traffic exchanged between the user device 101 and the guest applications via the emulation environment. This includes monitoring and analyzing the various calls or application executions required for accessing different remote services 105 that may be called by the different utilities in the emulation environment. Hence, the platform 103 extracts the network access descriptors 117.

The emulation procedure may be initiated by the user such as during registration of the application 102 with the controlled access platform 103. By way of example, the user is provided with a pass code to enable access to the emulation environment via the controlled access platform 103. For security purposes, the pass code can be delivered to the subscribed user by way of a phone call or text message from a provider of the platform 103. Once received, the user enters the pass code into an entry interface (e.g., web-based) and waits for confirmation that the emulation environment customization for the user and their respective user device 101 has been completed.

Only traffic associated with completing the registration process is allowed into the emulation environment and only traffic associated with the emulation tool is allowed to be directed towards the remote services 105 as called by the different utilities in the emulation environment. It is noted that per this environment, application traffic originates and terminates between the emulation environment and the remote service 105. The controlled access platform 103 is provisioned with an IP address that is as close as possible to the IP address associated with the IP entity of the user for accessing the service provider network 109.

In the case where the IP entity is related to a stationary computing device, such as a desktop computer, the emulation environment IP address can be selected from the same pool associated with the subscriber/user IP management entity. For example, the IP address pool may be associated with the broadband router access server (BRAS) that is providing service to the user device 101 (desktop). This information is made available to the controlled access platform 103 as a result of the initial circuit identification process described previously.

In the case where the IP entity is related to a mobile device, such as a wireless tablet device or smartphone, the IP address information may be related to the current gateway (e.g., PDN-GW) to which the user device 101 (mobile device) is associated. This is typically dependent upon the area where the mobile device is located. In one embodiment, therefore, the provider of the network 109 to which the user device 101 is subscribed may provide the information on the appropriate enforcement point directly to the platform 103. Under this scenario, the information can be retrieved via a location mapping function (LMF), which is an element within the network 109 that can be queried to supply information related to the current location. This may include, for example, a Mobility Management Entity (MME) for a particular generation of mobile network access of the like.

It is noted that the controlled access platform 103 may operate in connection with a regional controller (not shown) corresponding to the location of the mobile device for carrying out the query. The regional controller may be configured to interact with the automated mapping function (AMF) of the controlled access platform 103 to collect information regarding the user IP addresses and the appropriate enforcement points. The regional controller also applies the appropriate limiting rules to the different enforcement elements.

The controlled access platform 103 adapts to the wired and wireless network design associated with the service provider network 109. For example, the network provider may require the regional controller to communicate only with the policy and charging rules function (PCRF) and not with the enforcement elements. The controlled access platform 103 may receive information related to operation of the enforcement element. It is noted that the regional controller is thus responsible for transactions with a set of enforcement points, i.e., for example based on geographical distribution.

The controlled access platform 103 associates itself with the IP entity/enforcement element (e.g., the BRAS or the PDN-GW) that provides service to the mobile device in its current position. As such, traffic generated from within the emulation environment is associated with the identified enforcement element and traffic is forwarded in a similar manner. The subscriber is then instructed to invoke/use/interact with the guest applications one-at-a-time, including connecting to and/or calling any remote services 105 accordingly. As a result, network access descriptors 117 are extracted from the traffic, including the application IP address and the corresponding transport layer port numbers. The platform 103 also records the FQDN (Fully Qualified Domain Name) associated with the DNS queries related to the application 102 and the traffic exchanged with the called remote services 105. By way of example, the platform 103 keeps track of those FQDN entries and associates them with the guest application in question for the user device 101. A single guest application may be associated with multiple FQDNs. Once extracted, the profile 107 is updated and/or merged to include the guest network access descriptors and this information is used to provision the appropriate enforcement point (per the rules).

In certain embodiments, the controlled access platform 103 periodically instructs the emulation environment to initiate DNS queries for the FQDN associated with the user profile 107. This execution is performed to ensure the DNS to IP association is consistently updated within the profile 107 and is completed without user intervention. This enables the controlled access platform 103 to accommodate changes in IP addresses on the application side or as required for accessing various remote services 105.

In certain embodiments, the controlled access platform 103 updates the corresponding filtering rules (e.g., updates the enforcement elements) as specified via the profile 107 based on the gathered network access descriptors 117, IP entity and circuit and network topology data. The controlled access platform 103 then compiles all the information associated with the application 102 into the profile 107. For the purpose of illustration, a compiled profile 107 record is shown below in Table 6.

TABLE 6

Subscriber account ID = DCAS_ACCT/WXYZ67890
Number of Applications = 2
Subscriber_Application Sequence = 0001
   Application class = Configured
   Application ID = 1234
   Subscriber IP Address Pool = 192.168.20.0/22
   Application Descriptors Number of Items = 2
   Time Stamp for last Application Descriptors Query Response = March 10$^{th}$, 2012 09:08:55
   Application Descriptors Response Source = 3.3.3.3
     Application Address Descriptor Item Number 1
       Application IP address (or range) for descriptor Number 1 = 192.169.1.100/32
       Application Port number Item No 1 for descriptor Number 1 = 443
       Application Port number Item No 2 for descriptor Number 1 = 22

TABLE 6-continued

Application Address Descriptor Item Number 2
       Application IP address (or range) for descriptor Number 2 = 192.169.1.107/32
       Application Port number Item No 1 for descriptor Number 2 = 80
Subscriber_Application Sequence = 0002
   Application class = Guest
   Application ID = 9876
   Subscriber IP Address Pool = 192.168.20.0/22
   Application Descriptors Number of Items = 1
     Application Address Descriptor Item Number 1
     Time Stamp for Application Address Descriptor Item Number 1 = March 10$^{th}$, 20xx 11:28:35
       Application IP address (or range) for descriptor Number 1 = 192.170.1.1/32
       Application Port number Item No 1 for descriptor Number 1 = 443

In certain embodiments, the controlled access platform 103 associates a time stamp with the various network access descriptors. The time stamp enables the platform 103 to track when a particular network access descriptor 117 is added to the user profile 107. By way of this approach, the controlled access platform 103 has a configurable parameter for determining whether the network access descriptors 117 are current. Older descriptors 117 specified within a profile 107 may be set to expire (in particular for the case of guest applications) after a period of time. Upon expiration, the controlled access platform 103 may perform a query for updating the descriptors 117 (in the case of a configured application) or prompt user initiation of the emulation procedure (in the case of a guest application). Activation of a profile 107 and thus enforcement of various rules in connection with an application 102, service 105 or associated enforcement elements (IP entities) of a device 101, is dependent upon the relevance of the network access descriptors 117. Hence, the amount of time elapsed since the addition of a descriptor 117 to a user profile 107 may be adjusted accordingly via the controlled access platform 103.

It is noted that maintenance and tracking of the time stamp enables the controlled access platform 103 to balance the need for user device security 103 and selective functionality. For example, if an application IP address or other descriptor 117 is added to a user profile 107 at one point but failed to be added to the profile 107 during a subsequent update, this indicates an infrastructure change on the service 105 side. Accordingly, the entry is removed from the profile 107 for the corresponding application 102 as it is not valid for the configurable period of time. For configured applications, the time stamp may be kept for the overall set of applications of the device 101 given that the controlled access platform 103 is responsible for maintaining the descriptors 117 automatically. In contrast, for guest applications, the time stamp is maintained for each IP address or IP address range. In addition to time based enablement of a profile 107, the user of a device 101 may also opt to activate or deactivate a profile for a particular application 102 and/or corresponding service 105 at their discretion.

In another embodiment, once the descriptors 117 are acquired and associated with the user profile 107 (identifying which IP addresses and ports are allowed), this information is mapped into provisioning statements appropriate for the IP entity in which the enforcement rules will apply. The enforcement rules correspond to those for establishing limited accessing of services 105 by an application 102 per the network 109. Hence, as discussed earlier, the IP entity is usually the component within the network topography/circuit of the user device 101 that is responsible for allocating the IP addresses (e.g., BRAS for a high speed internet service such as DSL or a PDN-GW for certain generations of wireless devices).

The rules that correspond to the user profile 107 are associated with an object on the enforcement element such that per-user traffic limiting is possible. For example, in the case of a BRAS as the enforcement element, the interface associated with the user ATM PVC or the Ethernet VLAN (which is associated with the subscriber dynamic IP address) is mapped by the controlled access platform 103 as an object to apply the rules to. In the case of a wireless device, the tunnel object associated with the subscriber bearer is an appropriate object to associate with the rules on the PDN-GW. Table 7 below is an example of a provisioning statement for applying the appropriate rules per the profile 107. For the purpose of illustration, the example is based on a DSL subscriber associated with an ATM circuit on a BRAS.

TABLE 7

Interface ATM 8/2.33.918 (identifying the slot/port and ATM VP/VC information for the subscriber circuit on the BRAS)
Description DSL subscriber account ID W_DATA_ACCT/NY/WPL/ABCD12345 (description for the DSL account ID)
Encapsulation DHCP (Encapsulation type)
IP DHCP Pool Pool_1 (identifying the IP pool from which the subscriber is assigned an IP address)
Pool_1 192.168.20.0/22 (IP pools associated with subscribers)
ALLOW IP Packet Source=Local, DST= 192.169.1.100/32 PORTS TCP 443 22 OUT
ALLOW IP Packet Source=192.169.1.100/32, DST= Local PORTS TCP 443 22 IN
ALLOW IP Packet Source=Local, DST= 192.169.1.107/32 PORTS TCP 80 OUT
ALLOW IP Packet Source=192.169.1.107/32, DST= Local PORTS TCP 80 IN
ALLOW IP Packet Source=Local, DST= 192.170.1.1/32 PORTS TCP 443 OUT
ALLOW IP Packet Source=192.170.1.1/32, DST= Local PORTS TCP 443 IN
ALLOW IP Packet Source=Local, DST= Other_Approved_Services_IP, PORTS=Other_needed_services
ALLOW IP Packet Source= Other_Approved_Services_IP, DST=Local, PORTS=Other_needed_services
DENY ALL Per this example, the "ALLOW IP Packet Source" string references the specific network access descriptor to be allowed upon activation of the profile 107 for the associated IP entity. The "Local" string is a reference to the dynamic IP address currently assigned to the user. The "IN" string refers to application of the traffic filtering action in the IN direction (from the outside going into the subscriber domain). Also, the "OUT" string refers to application of the traffic filtering action in the OUT direction (from the subscriber domain and going outside).

Still further, the "DENY ALL" string references the dropping of all packets except those explicitly allowed in previous ALLOW statements. The "Other_needed_services" string references any ports needed for successful internet access and other related services such as dynamic host configuration protocol (DHCP), domain name service (DNS), etc.

The controlled access platform 103 forwards the command set to the regional controller (not shown), which communicates with the enforcement element(s) (e.g., the corresponding IP entity) and applies the provisioning commands accordingly. Alternatively, the network provider may configure the controlled access platform 103 to provide the provisioning commands to the OSS (which is responsible for the overall provisioning of the enforcement point). The OSS in turn applies those provisioning commands to the enforcement element, or enforcement point within the circuit/network path, as instructed.

After the controlled access platform 103 receives a confirmation that the provisioning commands are in place, the subscriber is notified that the profile activation process has been completed. By way of this approach, when the user activates their profile 107 the provisioning commands are applied to the interface on the enforcement element. Similarly, when the controlled access platform 103 deactivates their profile 107, the provisioning commands are also removed or deactivated.

In certain embodiments, the controlled access platform 103 must account for changes in the enforcement point or corresponding element over time due to mobility of the user device 101. For example, the correlation between mobility events and the change of the enforcement point depends on the configuration of the service provider network 109 and/or the mobile device technology. To address this issue, the controlled access platform 103 must be able to identify if there is a need to change the enforcement point over time. If determined, the provisioning commands are then applied to the new enforcement element currently handling the subscriber, i.e., a PDN-GW or any other mobility support component associated with the area where the mobile device is currently residing.

By way of example, there are two approaches by which the controlled access platform 103 may access the enforcement information. In a first approach, the information about the appropriate enforcement element may be retrieved directly from the network provider (mobile services provider). Under this scenario, a location mapping function (LMF) element within the network may supply information related to the current location associated with the device 101 (e.g., the Mobility Management Entity (MME) in the LTE environment). In this approach, the controlled access platform 103 provides the LMF with the identity of the subscribed user devices and the LMF continues to provide information on the current PDN-GW providing service to the device 101.

The controlled access platform 103 retrieves the corresponding circuit information (topology information) from the provider accordingly, such as by way of a query procedure. The query may be submitted as a request for the following information per Table 8 below:

TABLE 8

Type of request
The mobile Data Subscriber Account ID for which the controlled access platform 103 is requesting the corresponding topology information
The IP address or hostname for the query source (e.g., the controlled access platform 103)
The IP address or hostname for the query target (e.g., LMF)

The topology response, as received from the OSS system, may include the following information, per Table 9:

TABLE 9

Type of update
The IP address or hostname for the update source (e.g., LMF)
The IP address or hostname for the update target (e.g., controlled access platform 103)
The Data Subscriber Account ID for which the LMF is providing an update event
Enforcement element/IP entity type (e.g., PDN-GW)
Enforcement element/IP entity identification
Descriptors associated with the subscriber termination point on the enforcement element (e.g., the general packet radio service (GPRS) Tunneling Protocol termination point for the user device 101)

For the second approach, the controlled access platform 103 instructs the regional controller to query the AMFs of the service provider network 109 to acquire the information on which IP entity (e.g., the PDN-GW) is currently providing the service to the mobile device. The regional controller then forwards the information to the controlled access platform 103 in response to the query. Under this scenario, AMF elements of the service provider network 109 with no information about the subscriber will not provide updates to the regional controller.

The Request to add the mobile device may include the following fields, as shown in Table 10 below:

TABLE 10

Type of request
The mobile Data Subscriber Account ID for which the controlled access platform 103 is requesting the corresponding topology information
The IP address or hostname for the query source (e.g., controlled access platform 103)
The IP address or hostname for the query target (e.g., AMF)

The event update from the AMF to the controlled access platform 103 may include the following information, as shown in Table 11 below:

TABLE 11

Type of update
The IP address or hostname for the update source (e.g., AMF)
The IP address or hostname for the update target (e.g., regional controller)
The Data Subscriber Account ID for which the AMF is providing an update event
Enforcement element/IP entity type (e.g., PDN-GW, . . .)
Enforcement element identification
Descriptors associated with the subscriber termination point on the enforcement element (e.g., the general packet radio service (GPRS) Tunneling Protocol termination point for the user device 101)

The above request and response procedures may be generated according to various formats, e.g., as an extended markup language (XML) input/output.

It is noted that the controlled access platform 103 enables the enforcement of various rules, per a profile 107, for specific applications 102 and remote services 105 associated with a user device 101. To ensure seamless execution of an application or device 101 during the restricted operation period, the controlled access platform 103 may be triggered to troubleshoot issues such as when the user device 101 is not able to use an application (configured or guest application) that previously worked. As another example, the troubleshooting may occur when a packet drop is observed on the subscriber-specific filter on the enforcement point. Various other conditions may also be observed for triggering a troubleshooting condition of the platform 103.

The controlled access platform 103 may be implemented for execution within a service provider network. According to certain embodiments, one or more networks, such as data network 111, telephony network 113 and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions. The controlled access platform 103 may be further interfaced with external networks, including those of third party content providers, by way of various network interface and sharing arrangements and policies.

Still further, networks 109-115 may embody various content delivery networks for facilitating the delivery of traffic to user devices on behalf of a corresponding service 105a-105n. In addition, the networks 109-115 may include various components for facilitating interaction with the user devices 101a-101n. By way of example, the network 109-115 may include one or more regional controllers for interacting with an address mapping function (AMF) of the network. Also, the networks 109-115 may be supported by one or more of the following technologies or systems for enabling device connectivity and tracking: Radius, Diameter, Broadband Remote Access Servers (BRAS), packet data network-gateways (PDN-GW), Policy and Charging Rules Functions (PCRF), mobility management entities (MME) and the like.

According to exemplary embodiments, one or more of the user devices 101a-101n may be utilized to communicate over system 100 and may include any customer premise equipment (CPE) capable of sending and/or receiving information over one or more of networks 109-115. For instance, a voice terminal may be any suitable plain old telephone service (POTS) device, facsimile machine, etc., whereas mobile device (or terminal) may be any cellular phone, radiophone, satellite phone, smartphone, wireless phone, or any other suitable mobile device, such as a personal digital assistant (PDA), pocket personal computer, tablet, customized hardware, etc. Further, the user devices 101a-101n may be any suitable computing device, such as a VoIP phone, skinny client control protocol (SCCP) phone, session initiation protocol (SIP) phone, IP phone, personal computer, softphone, workstation, terminal, server, etc. In certain embodiments, the user devices 101a-101n, referred to herein collectively as user devices 101, may further execute various applications 102a-102n.

It is noted that the controlled access platform 103 may be activated by a user of a device 101 in response to a security condition of the device 101. For example, the user may activate a profile associated with a particular application upon determining a potential security threat or data breach occurrence. In another example, the user may opt to invoke the profile 107 to accommodate different usage conditions, i.e., when the user is employing a sensitive application or wishes to allow another user to employ an application on a limited basis. Alternatively, certain applications may be configured to automatically invoke activation of a profile 107 upon detecting a security condition. For example, when a virus condition is determined, a security or protection application of the user device 101 may be configured to invoke execution of the profile 107.

Figure 2:
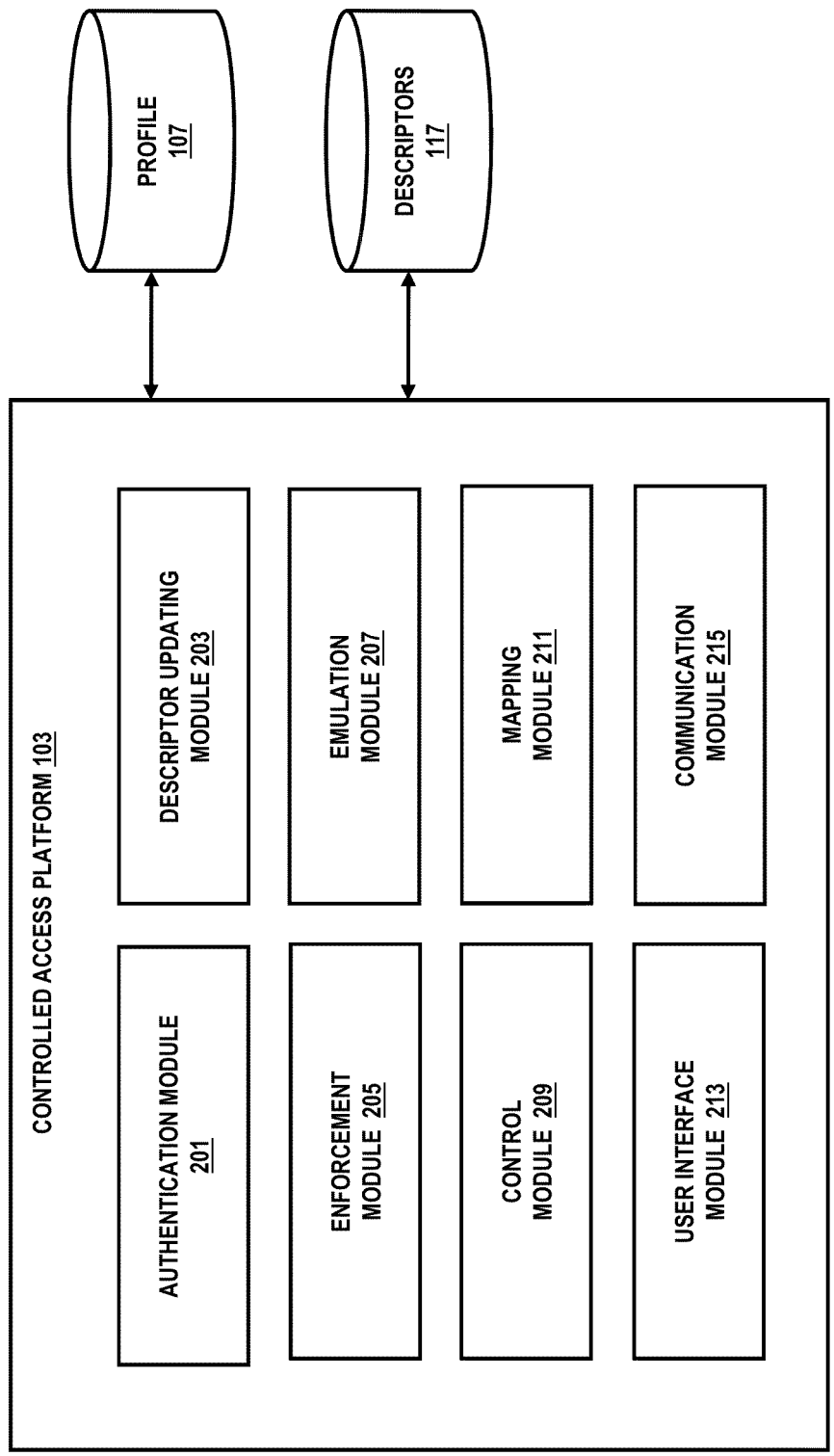
FIG. 2 is a diagram depicting the components of a controlled access platform, according to one embodiment.

FIG. 2 is a diagram of a controlled access platform, according to one embodiment. The controlled access platform 103 includes various executable modules for performing one or more computing, data processing and network based instructions that in combination provide a means for enabling controlled access. Such modules can be implemented in hardware, firmware, software or a combination thereof. By way of example, the controlled access platform 103 may include an authentication module 201, a descriptor updating module 203, an enforcement module 205, an emulation module 207, a control module 209, a mapping module 211, a user interface module 213 and a communication module 215.

In addition, the controlled access platform 103 also maintains profiles 107 as generated based, at least in part, on one or more descriptors 117 pertaining to various applications and remote services of a user device. It is noted the modules 201-215 of the controlled access platform 103 may access databases 107 and 117 for performing various executable functions.

In one embodiment, an authentication module 201 authenticates users and corresponding user devices 101 for interaction with the controlled access platform 103. The authentication procedure may be established a first time via a subscription process then later executed by the subscribed device for enabling profile 107 activation. By way of example, the subscription procedure may include user entry of contact information, device information and user device usage preferences. In addition, the user may specify which applications a profile 107 is to be created for as well as the specific rules to be associated with each command and/or function of the application or remote service. The authentication module 201 may therefore operate in conjunction with the descriptor updating module 203 for enabling automatic retrieval of network access descriptors 117 (for configured applications). Alternatively, the authentication module 201 operates in connection with the emulation module 207 for extracting network access descriptors 117 in response to a determination that the application is a guest application.

In one embodiment, the control module 209 controls the operations of the various other modules of the platform 103, including triggering execution of different modules accordingly. For example, the control module 209 identifies which services and/or applications are configured with an interface element for facilitating access to the descriptors (configured) and which are not. In the case of the configured applications, where the interface is implemented, the control module 209 triggers execution of the descriptor updating module 203 to facilitate retrieval of the descriptors from the accompanying service or application. In addition, the descriptor updating module 203 retrieves updated descriptors 117 in instances where the timestamps associated with previously determined descriptors are out of date (e.g., based on a predetermined amount of time elapsed). Under this scenario, the updating function may be performed periodically by the module 203, with the periodicity being established by the user as per the subscriptions procedure.

In the case of guest applications, however, where no interface is present for the application, the control module 209 facilitates execution of the emulation module 207. In certain embodiments, the emulation module 207 enables user activation of an emulation environment via one or more different emulation utilities. By way of example, utilities may include a hypertext transfer protocol (HTTP) client, a secure shell (SSH) client, a Telnet client or a customized application client. As the user interacts with the guest application 102 within this environment, the module 207 then analyzes the traffic exchanged between the user device 101 and the guest applications and extracts the network access descriptors 117 accordingly.

The control module 209 further calls upon the mapping module 211. In one embodiment, the mapping module 211 submits the location information request to a location mapping function (LMF) element within the network 109. For example, in the case of a long-term edge (LTE) wireless network, a Mobility Management Entity (MME) may be queried accordingly. The mapping module 211 further determines topological information regarding the one or more IP entities associated with a given user device 101 for which to establish enforcement. The mapping module 211 retrieves the corresponding circuit information (topology information) from the provider accordingly, such as by way of a query procedure. In addition, the controlled access platform 103 may interface with an operations support system (OSS) of the service provider network 109—which maintains the IP entity and circuit topology information—for retrieving the information via the query procedure.

It is noted that the request and response procedures, as per the queries, may be generated according to various formats, e.g., as an extended markup language (XML) input/output. For example, in Table 12, an exemplary XML schema/message for requesting topology information from an OSS of the network provider is presented as follows:

TABLE 12

<?xml version="1.0" encoding="UTF-8"?>
<XmlInterfaceRequest>
<Query>
<QueryType>TopologyCircuit</QueryType>
<DataSubscriberAcct>W_DATA_ACCT/NY/WPL/ABCD12345
</DataSubscriberAcct >
<QuerySource>1.1.1.1</QuerySource>
<QueryTarget>2.2.2.2</QueryTarget>
</Query>
</XmlInterfaceRequest>

The control module 209 also enables updating and/or compilation of the profile 107, such as in response to the descriptors 117 as acquired by the emulation module 207 or descriptor updating module 203 along with the topology information. The control module 209 may generate an alert or notification for indicating that the profile 107 is updated and available for a given application of the user device 101.

In one embodiment, the enforcement module 205 causes a provisioning of the rules as established via the profile 107 at the respective IP entities associated with the user device 101. By way of example, the profile 107 is mapped into provisioning statements appropriate for the IP. The enforcement module 205 may facilitate the provisioning by way of a regional controller of the network 109. Alternatively, the network provider may configure the controlled access platform 103 to provide the provisioning commands to the operations support system (OSS), which is responsible for the overall provisioning of the enforcement point. The OSS in turn applies those provisioning commands to the enforcement element or enforcement point within the circuit/network path, as instructed. As noted, the enforcement rules correspond to those for establishing limited accessing of services 105 by an application 102 per the network 109.

It is noted that when the user activates their profile 107 the provisioning commands are applied to the interface on the enforcement element (e.g., IP entity) accordingly by the enforcement element 205. Similarly, when the controlled access platform 103 deactivates their profile 107, the provisioning commands are also removed or deactivated by the enforcement element 205 accordingly.

In one embodiment, the user interface module 213 facilitates generation of various interfaces for enabling users to interact with the controlled access platform 103. This includes, for example, generation of a login interface for enabling user registration and/or access to the platform 103. In addition, the module 213 may provide a configuration interface for enabling users to generate profiles 107. By way of example, the user interface module 213 may generate different user interface elements for selection by registered users. It is noted that the user interface module 213 may be activated by way of various application programming interfaces (APIs) or other function calls at a computing device of the third party content provider.

In one embodiment, the communication module 215 executes various protocols and data sharing techniques for enabling collaborative execution between the controlled access platform 103 and the applications 102 and/or user device 101. In addition, the communication module 215 enables generation of signals for communicating with various elements of the service provider network, including various gateways, mapping functions, policy configuration functions and the like. Also, the communication module 215 may be able to connect with an interface element of an application or IP entity (enforcement element) for retrieving descriptors 117 or for enabling submission of queries per the mapping or enforcement modules 211 and 205 respectively.

The above described modules 201-215 and components of the controlled access platform 103 can be implemented in hardware, firmware, software, or a combination thereof. Though depicted as a separate entity in FIG. 1, it is contemplated that the controlled access platform 103 may be implemented for direct operation by various components of the service provider network. As such, the platform 103 generates direct signal inputs by way of the operating system of the network access point. In another embodiment, one or more of the modules 201-215 may be implemented for operation as a platform 103 maintained as a hosted or cloud based solution.

FIGS. 3A-3C are flowcharts of processes for controlled access to a limited set of remote applications associated with a device, according to various embodiments. For the purpose of illustration, the processes are described with respect to FIG. 1. It is noted that the steps of the processes may be performed in any suitable order as well as combined or separated in any suitable manner.

In step 301 of process 300, the controlled access platform 103 detects that a controlled access service is needed, for example by receiving an explicit trigger from the user or detecting a condition of the device associated with the calling application. In another step 303, the platform 103 determines one or more network access descriptors to associate with a calling application of a device configured to access a remote service via a communication network. As noted previously, the network access descriptors may include an IP address of a network access component associated with the device or as related to the calling application.

In another step 305, the controlled access platform 103 associates the one or more network access descriptors with a profile for defining one or more allowed network interaction types between the calling application and the remote service. Per step 307, the platform 103 also initiates a limiting of the calling application to the one or more allowed network interaction types with the remote service or a network access component associated with the device based on the profile. It is noted the limiting of the calling application is based on the condition, i.e., as detected per step 301. As noted previously, the condition may be a security condition or an application usage condition, or a trigger from the user.

In step 309 of process 308 (FIG. 3B), the controlled access platform 103 determines activation of a secure emulation mode of operation of the device. The emulation environment may be executed by way of a hypertext transfer protocol (HTTP) client, a secure shell (SSH) client, a Telnet client, a customized application client or any other terminal services tool. In step 311, the platform 103 monitors one or more network interaction types between the calling utility application and the remote service during the secure emulation mode of operation. As noted previously, the secure emulation mode of operation is active for a predetermined period of time or for a predetermined number of network interaction types.

Per step 313, the controlled access platform 103 collects, based on the monitoring, the one or more network access descriptors. As noted previously, the one or more network access descriptors include a network address or a network channel associated with the calling application or the remote service, a network access component associated with the calling application or the remote service, or a combination thereof. In certain embodiments, the network access descriptors 117 may include a set of values, such as the IP address or set of IP addresses and transmission control protocol (TCP) or user datagram protocol (UDP) port numbers associated with an application. This may include data contained in fields in the IP and transport layer headers of data transmitted by the application 102 for calling out to or accessing the various remote services 105. In addition, the network access descriptors 117 may further include fields such as a quality of service (QoS) indication or priority marking.

In step 315 or process 314 (FIG. 3C), the controlled access platform 103 determines a time stamp associated with each of the one or more network descriptors. As noted previously, the time stamp enables the platform 103 to track when a particular network access descriptor 117 is added to the user profile 107 and whether the descriptor 117 is valid (e.g., within an acceptable time of use/relevance for the application) or accessible for retrieval/extraction per decision step 316. When determined not to be valid or accessible per decision step 316 and the application is determined to be a configured application per decision step 318, the controlled access platform 103 disassociates the network access descriptor from the profile when the amount of time since the time stamp is determined to exceed an effective time of use of the network access descriptor for the calling application. This corresponds to step 317. In another step 319, such as in the case of a configured application that is capable of being queried, the platform 103 then retrieves the one or more updated network access descriptors per step 321.

In the case of a guest application, per decision step 318, the user is instructed to go through a subsequent emulation procedure, corresponding to step 325. In another step 327, the platform 103 then associates the updated network access descriptors with the profile based on the retrieval.

It is noted that the above described approach provides the controlled access platform 103 with a configurable parameter for determining whether the network access descriptors 117 are current. Older descriptors 117 specified within a profile 107 may be set to expire (in particular for the case of guest applications) after a period of time, thus ensuring the enforcement procedure is always up-to-date.

FIGS. 4A-4E are diagrams of a user interfaces depicting user interaction with the controlled access platform, according to various embodiments. By way of example, the user interface depictions correspond to the interaction of users of devices 101 with the controlled access platform 103. It is noted, however, that the controlled access platform 103 may also be accessed by application and/or remote service providers for enabling the configuration of network descriptors related to various applications or remote services. For the purpose of illustration, user interaction with the platform 103 is conducted via a mobile device (e.g., tablet 400) that accesses the network via a wireless service provider network.

Figure 4A:
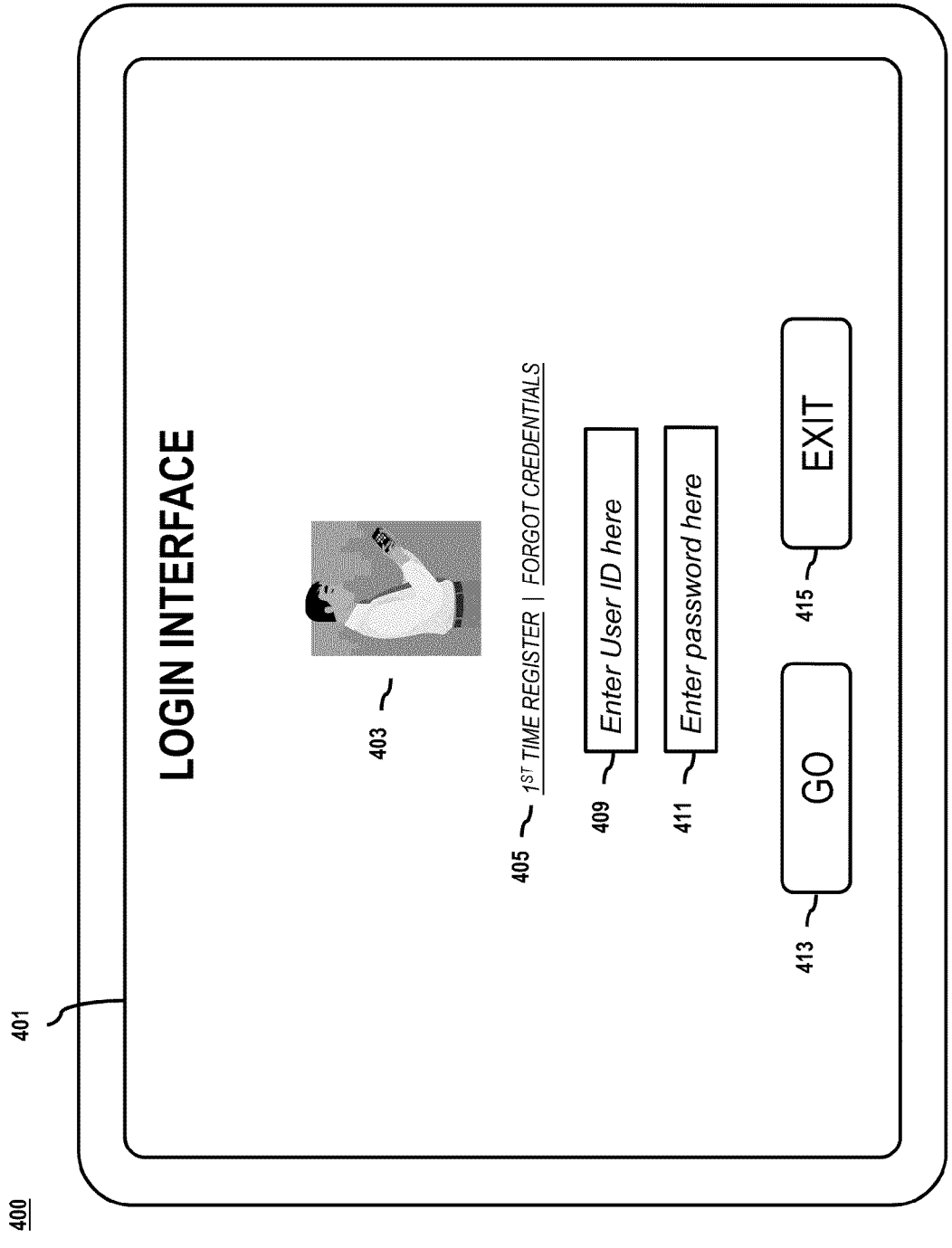
FIGS. 4A-4E are diagrams of a user interfaces depicting user interaction with the controlled access platform, according to various embodiments.

In FIG. 4A, a login interface 401 of the controlled access platform 103 is presented. This interface 401 is accessed by way of a web link corresponding to the controlled access platform 103 and is loaded to enable user registration (e.g., via link 405) with the platform 103 or updating of a profile 107. Under this scenario, the login interface 401 includes fields 409 and 411 respectively for permitting a user (e.g., consumer) 403 to enter their user identifier and password. These credentials correspond to those established by the system after first time registration. To activate the login procedure, the user may select the GO action button 413 while the EXIT action button 415 is selected when the user is ready to exit the interface 401. Once the credentials are verified, the user may be presented with a configuration interface 417.

Figure 4B:
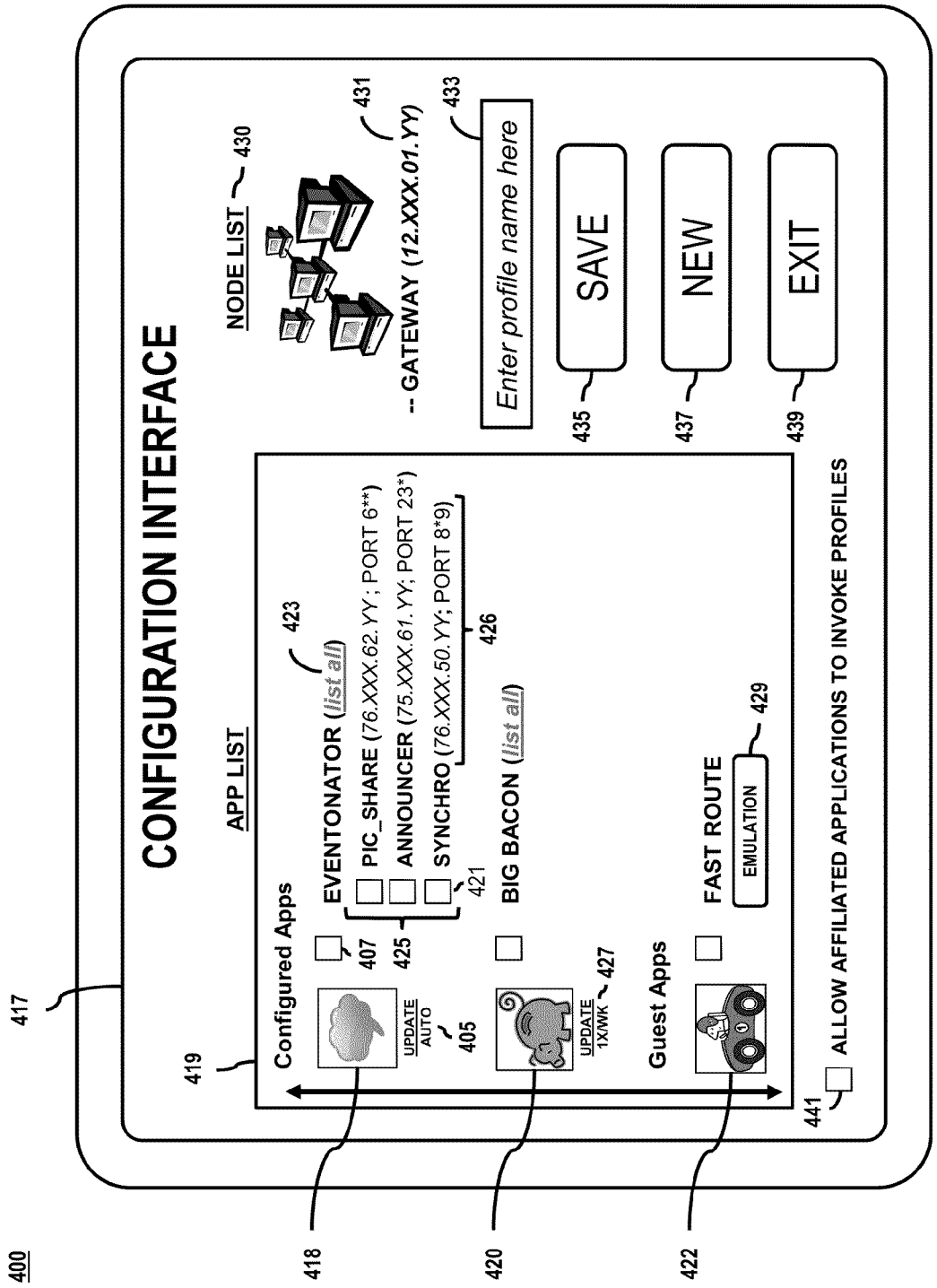

In FIG. 4B, the configuration interface 417 presents various user selection options for allowing the user to modify, update or create a profile for the different applications of the device 400. Some of the applications, such as an event sharing application 418 and finance application 420 are configured applications, while a travel route planning application 422 is a guest application (not configured). In the case of the configured applications 418 and 420, the user is presented with checkboxes (e.g., checkbox 407) for selecting the entire application as one to be restricted from accessing various remote services in response to activation of a profile. Alternatively, the user may select a list all link 423 for enabling the rendering of a list 425 of the specific remote executions associated with the application 418—the executions being presented by name along with corresponding network access descriptor information (e.g., descriptors 426). From this list 425, the user can then select individual remote executions to be enabled and/or disabled in relation to a profile.

By way of example, the event planning application 418 features various remote executions, which when activated result in the calling of different remote services. Per the list 425, an execution named "PIC_SHARE" corresponds to a picture sharing service that is accessible to application 102 via exemplary IP address and port information "76.XXX.62.YY; PORT 6**," where the characters X and Y represent numeric values corresponding to an IP address and the "*" character represent a numeric value corresponding to a port number. Another execution named "ANNOUNCER" corresponds to an event notification service that is accessible to the application 102 via IP address and port information "75.XXX.61.YY; PORT 23*." Still further, an execution named SYNCHRO corresponds to a synchronization service that is accessible to the application 102 via IP address and port information "76.XXX.50.YY; PORT 8*9." The user may opt to select the checkbox corresponding to each individual execution or only certain ones. Under this scenario, the user is able to customize the specification of which features of the application are to be enforced for enablement or disablement.

Activation of a checkbox signifies the corresponding execution is to be restricted from operation upon activation of a profile. In contract, non-activation (unchecking) of a checkbox signifies the corresponding execution is to be permitted upon activation of the profile. It is noted that the network descriptors (e.g., 426) for each execution with the list 425 is presented to the user automatically for the configured applications. Retrieval of this information corresponds to a query procedure of the controlled access platform 103 as performed upon entry to the configuration interface. In the case of the guest application 422, however, the network descriptors for the application 422 must be acquired via an emulation procedure. As such, an EMULATION action button 429 is presented to the interface 417 for enabling a user to invoke an emulation environment.

Also shown are update links 405 and 427 for applications 418 and 420 respectively. The update links 405 and 427 enable the user to specify the frequency of refresh of the network access descriptors for a given application. Under this scenario, the event planning application 418 is set to an AUTO update frequency while the financial application 420 is set to a weekly update cycle. The provider of service 105 may inform the controlled access provider about the recommended frequency. Still further, the user is presented with an option to allow certain applications to automatically invoke a profile. For example, upon activation of checkbox 441, a corresponding virus protection or security application of the user device 400 may call for execution of a specific profile in response to detection of a security condition of the device 400.

A node list 430 is also presented for depicting and/or listing the various IP entities (enforcement elements) that are associated with the user device 400 and/or the corresponding applications. Under this scenario, the mobile device 400 accesses a network via a gateway 431 (e.g., PDN-GW) device corresponding to an IP address of "12.XXX.01.YY." This information is presented to highlight the various enforcement elements and points to which the corresponding enforcement rules per selection or/deselection of a checkbox correspond to.

A field 433 is also presented for enabling the user to enter a profile name to associate with the settings as configured for a given application or set thereof. It is noted that the profile name may subsequently be selected from a profile activation list for enablement of the restricted rule set as configured. The user may select a SAVE, NEW or EXIT action button 435, 437 and 439 respectively for storing the profile as named, creating a new profile or exiting the configuration interface 417.

Figure 4C:
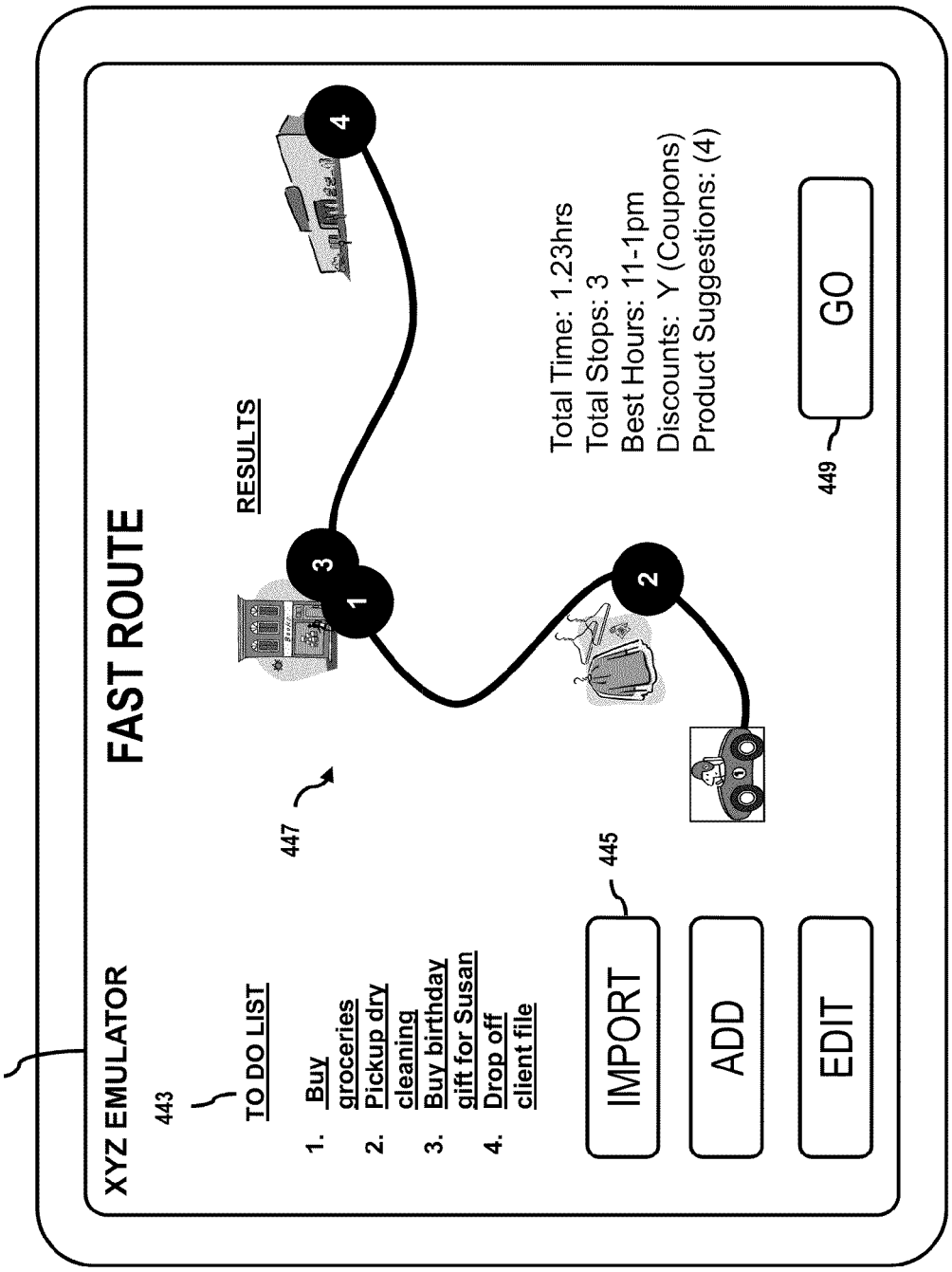

In FIG. 4C, an emulation mode of operation is depicted. For the purpose of illustration, the emulation environment is invoked by way of an XYZ Emulator tool in response to selection of the EMULATION action button 429. As noted, this option is selected for enabling user configuration of the route planning guest application 422. The XYZ Emulator tool is presented in this example as a graphical based tool via interface 440.

Having established the emulation procedure, an analysis function of the controlled access platform 103 is invoked for monitoring, collecting and subsequently determining the various descriptors associated with the application 422 based on user interaction with the corresponding application service. By way of example, the fast route application 422 is a travel planning and productivity application that enables the user to import to-do lists from designated online calendar services then generate customized/automated navigation routes for completing the list entries. As such, the import function 445, corresponding to invocation of action button 449, results in calling of a service for retrieving task/to-do information from different calendar services of the user. Access to the service corresponds to network identifiers (e.g., IP addresses) and protocol ports needed for successful transactions.

In addition, a merchant/discount service is accessed for correlating the to-do list items 443 with various coupons, offers and incentives, which include the accessing of information from a database at exemplary location yy.xxxx.xx.yy. Still further, selection of a GO action button 449 corresponds to the accessing of a mapping service at exemplary network location xx.xxxx.xx.yy, which is used to generate an optimized route map 447 for accomplishing of the task. It is noted that as the user interacts with the application via the emulator to invoke these functions, the IP addresses, corresponding ports and other descriptors are gathered and subsequently used to compile a profile relating to this application.

Figure 4D:
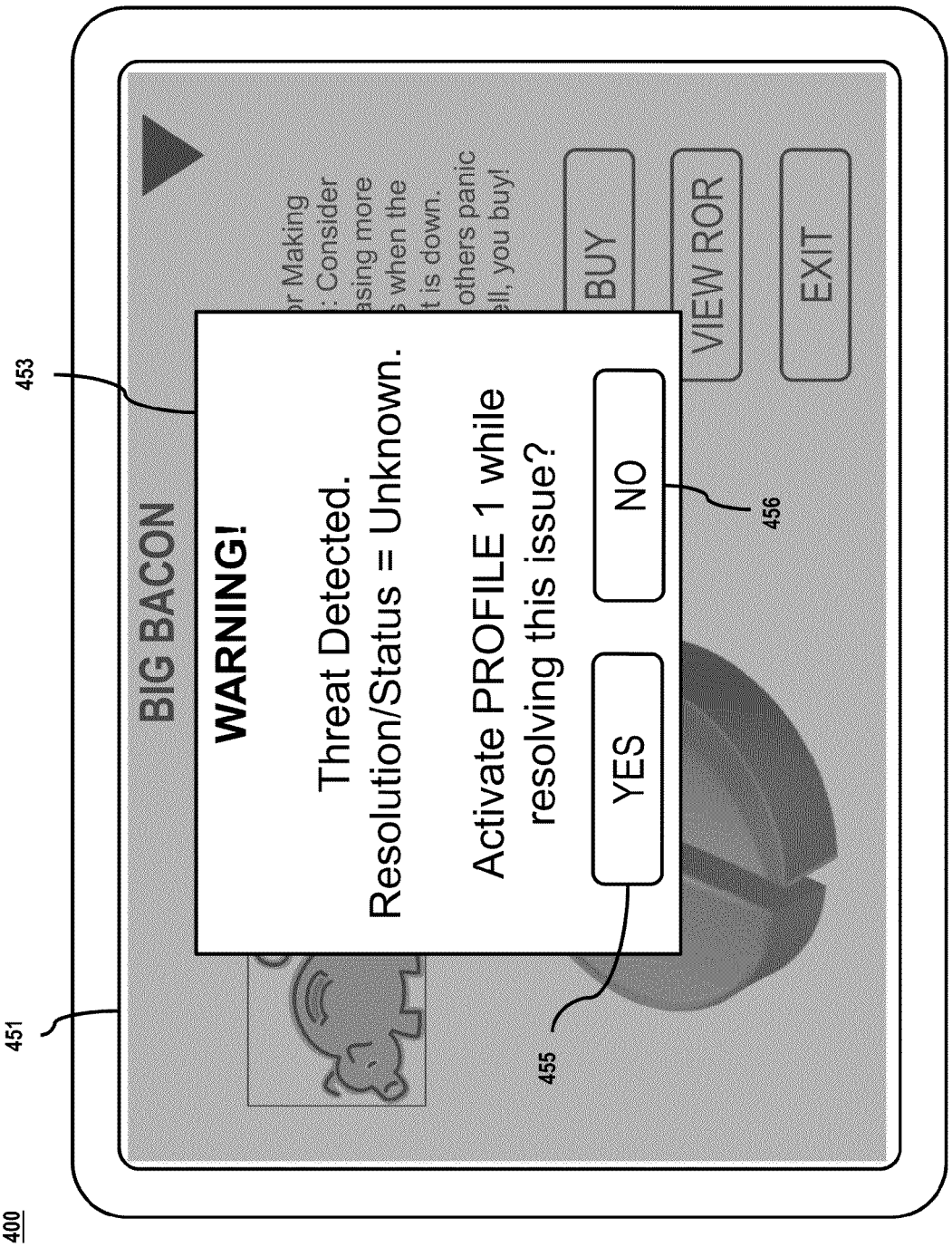
Figure 4E:
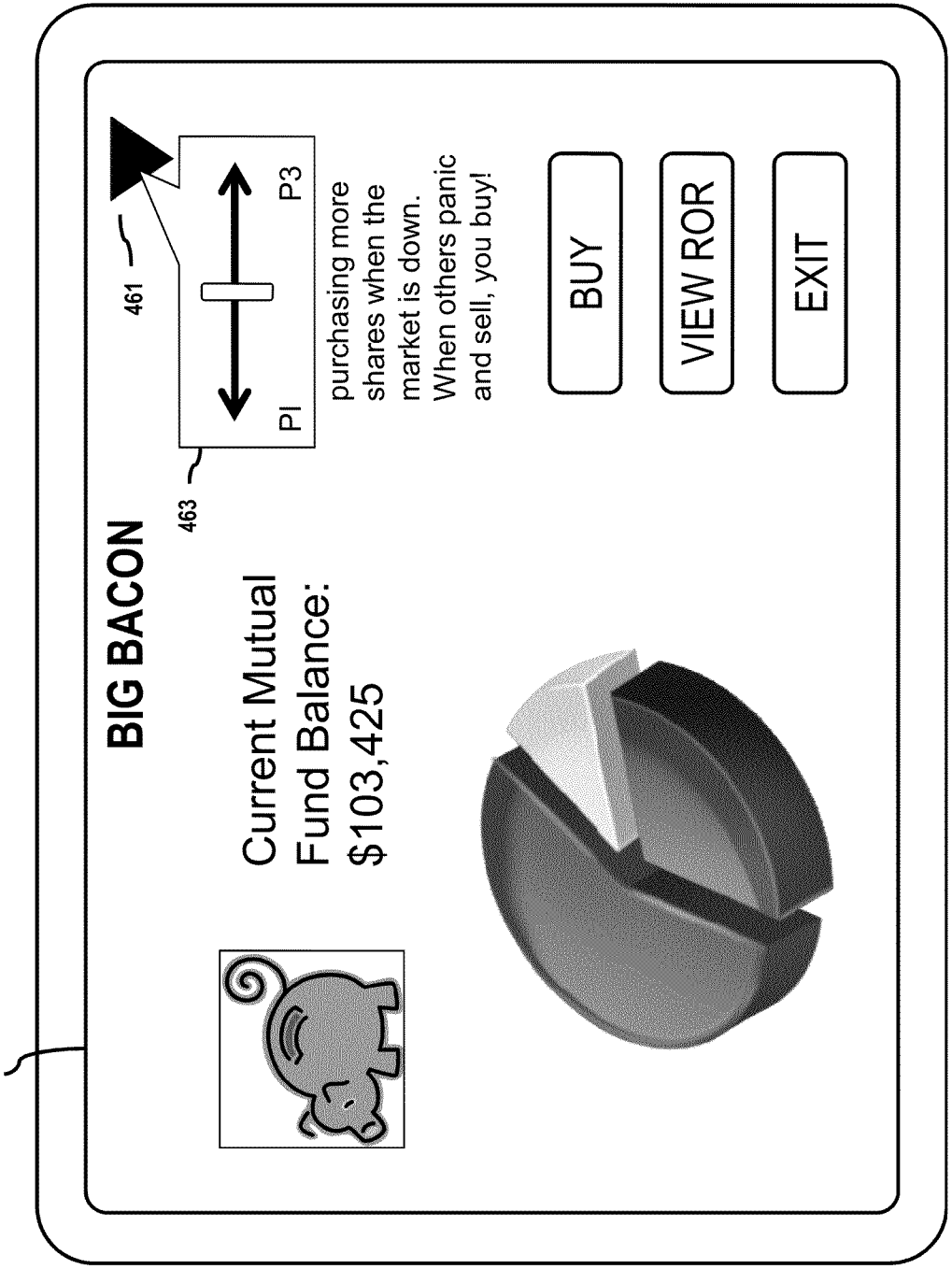

In FIGS. 4D and 4E, a user interface 451 corresponding to the finance application of the mobile device 400 is depicted. The figures depict different means of activating a profile once configured for a given application. Under this scenario, a profile labeled PROFILE 1 has already been established for this application per the configuration interface 417 of FIG. 4B. Hence, in one scenario, a security application of the device 400 detects a potential security threat and renders a notification message 453 to the display. The notification message 453 presents the user with YES or NO action buttons 455 and 456 respectively for permitting the security application to invoke the profile. When the user selects the YES action button 455, this activates the profile and therefore enables the user to continue operating the financial application in a secure but restricted/limited mode of operation. By way of example, the user may be permitted to only access a mutual fund transaction record from their financial institution based on their established profile settings. Similarly, the profile may restrict the function of the application for downloading the latest stock market values by blocking submission of the index reporting service at the network gateway. Hence, per the established profile, only certain financial transactions are allowed to be performed while the security application is allowed to troubleshoot or correct the security breach.

In FIG. 4E, another means of calling for execution of the controlled access platform 103 is depicted through manual activation. For example, as the user interacts with the financial application via interface 451, the user may initiate the platform 103. Under this scenario, the user selects an activation option button 461, which further causes rendering of a profile selector slide scroll 463. The user can slide the scroll 463 between different profile name positions (e.g., from left to right) to the specific profile they wish to execute for the financial application in question. By way of this approach, a user may activate a profile at anytime to accommodate for different application usage conditions.

The exemplary techniques and systems presented herein enables controlled access to a limited set of remote services associated with a device. In particular, a controlled access platform 103 enables user customization and selection of specific remote executions to be performed during operation of an application.

The processes described herein for enabling controlled access to a limited set of remote services associated with a device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
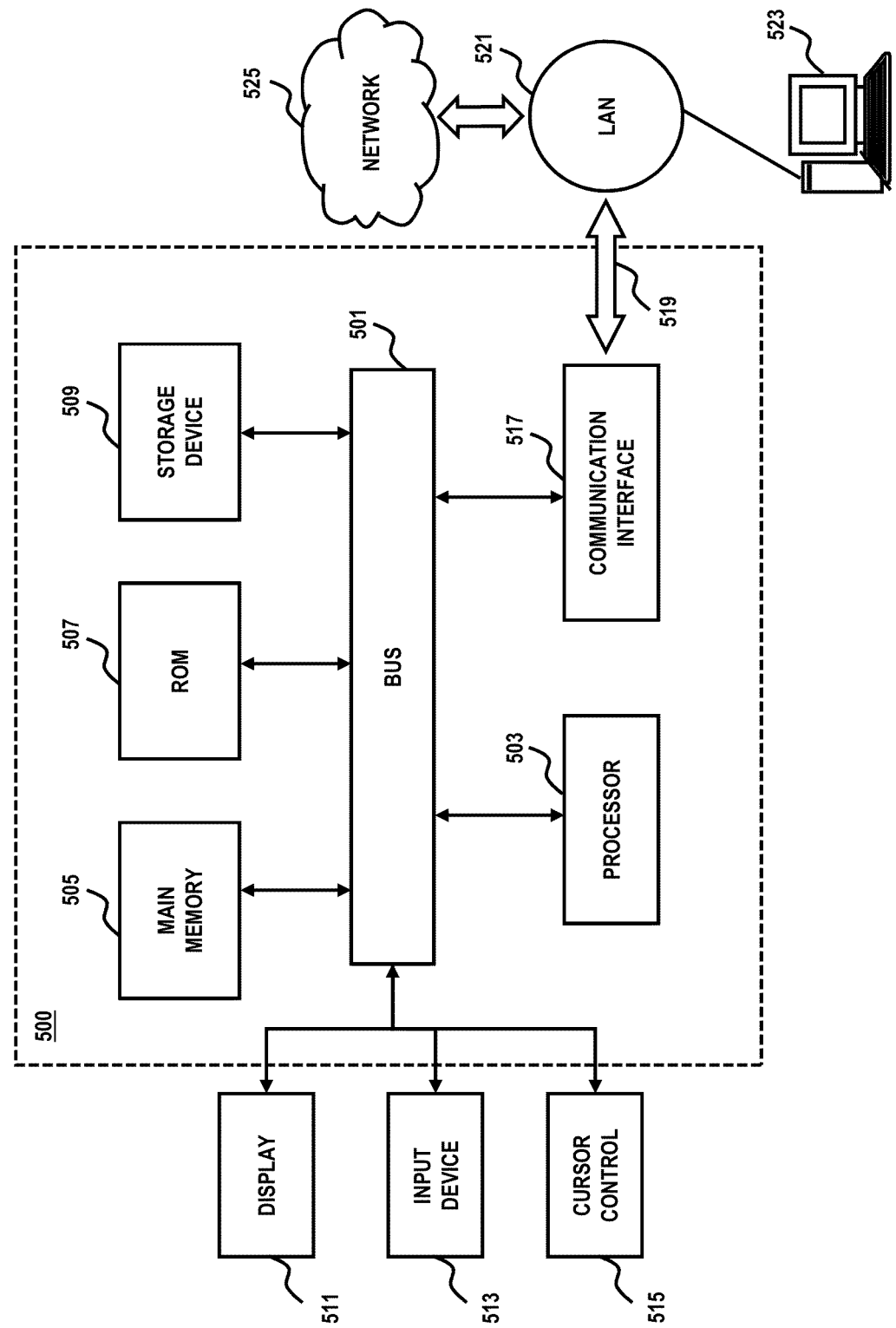
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4E, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
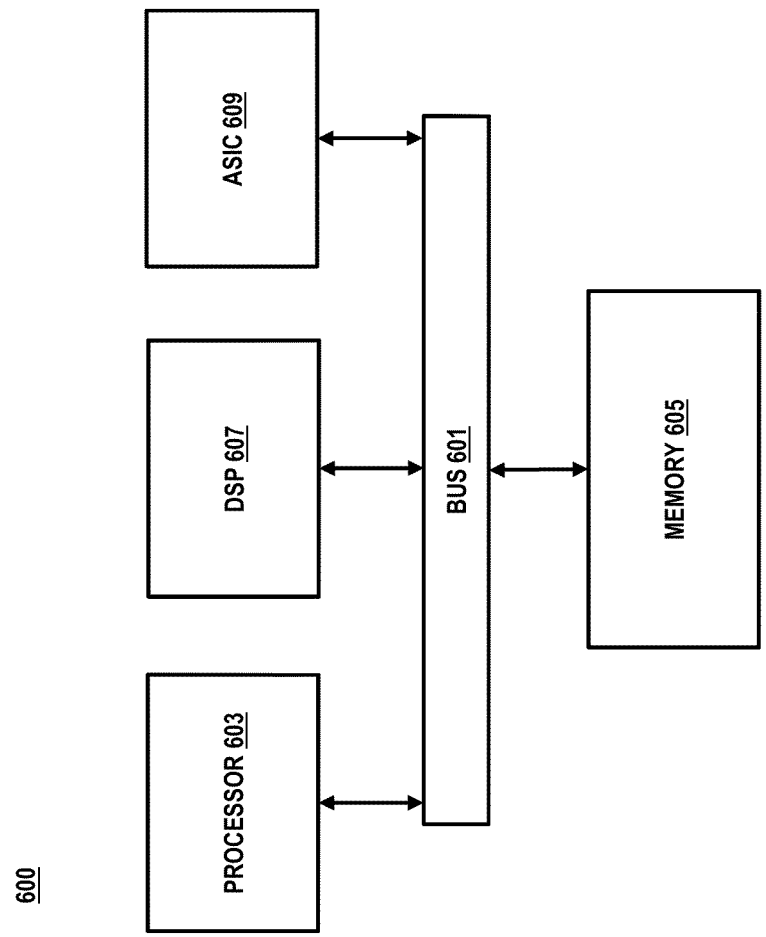
FIG. 6 is a diagram of a chip set that can be used to implement an embodiment of the invention.

FIG. 6 illustrates a chip set or chip 600 upon which an embodiment of the invention may be implemented. Chip set 600 is programmed for to enable controlled access to a limited set of remote services associated with a device as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling controlled access to a limited set of remote services associated with a device.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein for to enable controlled access to a limited set of remote services associated with a device. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    determining one or more network access descriptors to associate with a device and/or a calling application of the device configured to access a remote service via a communication network;
    associating the one or more network access descriptors with a profile for defining one or more allowed network interaction types between the device and/or the calling application and the remote service;
    initiating a limiting of the device and/or the calling application to the one or more allowed network interaction types with the remote service or a network access component associated with the device based on the profile;
    determining activation of a secure emulation mode of operation of the device; and
    monitoring one or more network interaction types between the device and/or the calling application and the remote service during the secure emulation mode of operation,
    wherein the profile specifies an IP address and corresponding network channel/port numbers assigned to a network access component or node that the device employs for accessing the remote service,
    wherein there are a plurality of different profiles, each different profile is created by a user of the device to accommodate each different security condition relative to the deice, and
    wherein the secure emulation mode of operation is active for a predetermined period of time or for a predetermined number of network interaction types.

2. A method of claim 1, further comprising:
    detecting a condition of the device associated with the calling application,
    wherein the limiting of the calling application is based on the condition and the condition is a security condition or an application usage condition.

3. A method of claim 2, wherein the condition is initiated by a user of the device, the calling application, or a security service associated with the device.

4. A method of claim 1, further comprising:
    collecting, based on the monitoring, the one or more network access descriptors,
    wherein the one or more network access descriptors include a network address or a network channel associated with the calling application or the remote service, a network access component associated with the calling application or the remote service, or a combination thereof.

5. A method of claim 1, further comprising:
    determining a time stamp associated with each of the one or more network access descriptors,
    wherein the time stamp corresponds to a time of association of the one or more network access descriptors with the profile.

6. A method of claim 5, further comprising:
    disassociating a network access descriptor from the profile when the amount of time since the time stamp is determined to exceed an effective time of use of the network access descriptor for the calling application.

7. A method of claim 5, further comprising:
    querying the remote service or the calling application to determine one or more updated network access descriptors;
    retrieving the one or more updated network access descriptors when a time period since the associated timestamp is determined to satisfy an effective time of use of the one or more update network access descriptors for the calling application or the remote service; and
    associating the updated network access descriptor with the profile based on the retrieval.

8. A method of claim 1, wherein the calling application and/or the remote service are configured in advance to share the one or more network access descriptors associated with the calling application or the remote service.

9. A method of claim 1, wherein the network access component is a network gateway system, a broadband router or a network element that supports IP interconnectivity.

10. An apparatus comprising:
    at least one processor; and
    at least one memory including computer program code for one or more programs,
    the at least one memory and the computer program code configured to, with the at least one processor, cause the apparatus to perform at least the following,
        determine one or more network access descriptors to associate with a device and/or a calling application of the device configured to access a remote service via a communication network;
        associate the one or more network access descriptors with a profile for defining one or more allowed network interaction types between the device and/or the calling application and the remote service;
        initiate a limiting of device and/or the calling application to the one or more allowed network interaction types with the remote service or a network access component associated with the device based on the profile;
        determine activation of a secure emulation mode of operation of the device; and monitor one or more network interaction types between the device and/or the calling application and the remote service during the secure emulation mode of operation,
    wherein the profile specifies an IP address and corresponding network channel/port numbers assigned to a network access component or node that the device employs for accessing the remote service,
        wherein there are a plurality of different profiles, each different profile is created by a user of the device to accommodate each different security condition relative to the device, and
        wherein the secure emulation mode of operation is active for a predetermined period of time or for a predetermined number of network interaction types.

11. An apparatus of claim 10, wherein the apparatus is further caused to:
    detect a condition of the device associated with the calling application,
    wherein the limiting of the calling application is based on the condition and the condition is a security condition or an application usage condition.

12. An apparatus of claim 11, wherein the condition is initiated by a user of the device, the calling application, or a security service associated with the device.

13. An apparatus of claim 10, wherein the apparatus is further caused to:
  collect, based on the monitoring, the one or more network access descriptors,
  wherein the one or more network access descriptors include a network address or a network channel associated with the calling application or the remote service, a network access component associated with the calling application or the remote service, or a combination thereof.

14. An apparatus of claim 10, wherein the apparatus is further caused to:
  determine a time stamp associated with each of the one or more network access descriptors,
  wherein the time stamp corresponds to a time of association of the one or more network access descriptors with the profile.

15. An apparatus of claim 14, wherein the apparatus is further caused to:
  disassociate a network access descriptor from the profile when the amount of time since the time stamp is determined to exceed an effective time of use of the network access descriptor for the calling application.

16. An apparatus of claim 14, wherein the apparatus is further caused to:
  query the remote service or the calling application or the remote service to determine one or more updated network access descriptors;
  retrieve the one or more updated network access descriptors when a time period since the associated timestamp is determined to satisfy an effective time of use of the one or more update network access descriptors for the calling application or the remote service; and
  associate the updated network access descriptor with the profile based on the retrieval.

17. An apparatus of claim 10, wherein the calling application and/or the remote service are configured in advance to share the one or more network access descriptors associated with the calling application or the remote service.

18. An apparatus of claim 10, wherein the network access component is a network gateway system, a broadband router or a network element that supports IP interconnectivity.

* * * * *